April 18, 1967    E. I. VALYI    3,314,475
COMPOSITE STRUCTURE

Original Filed June 14, 1962    2 Sheets—Sheet 1

INVENTOR.
EMERY I. VALYI
BY
Robert H. Bachman
ATTORNEY

April 18, 1967   E. I. VALYI   3,314,475
COMPOSITE STRUCTURE

Original Filed June 14, 1962   2 Sheets-Sheet 2

INVENTOR:
EMERY I. VALYI
BY
Robert H. Bachman
ATTORNEY

United States Patent Office 3,314,475
Patented Apr. 18, 1967

3,314,475
COMPOSITE STRUCTURE
Emery I. Valyi, Riverdale, N.Y., assignor to Olin Mathieson Chemical Corporation, a corporation of Virginia
Application Sept. 21, 1964, Ser. No. 398,128, now Patent No. 3,289,750, dated Dec. 6, 1966, which is a division of application Ser. No. 202,612, June 14, 1962, now Patent No. 3,201,858, dated Aug. 24, 1965. Divided and this application May 14, 1965, Ser. No. 464,892
10 Claims. (Cl. 165—170)

This application is a division of co-pending application Ser. No. 398,128, filed Sept. 21, 1964, which in turn is a division of application Ser. No. 202,612, now U.S. Patent 3,201,858, which in turn is a continuation-in-part of application Ser. No. 732,663, filed May 2, 1958, now U.S. Patent 3,049,795, which in turn is a continuation-in-part of application Ser. No. 586,259, filed May 21, 1956, now abandoned.

This invention relates to porous fabrications, and more particularly to a permeable body integrated to a supporting sheet metal structure adapted to conduct a fluid to the said permeable body for flow and distribution therethrough.

As brought out in the aforesaid co-pending applications, the subject matter thereof was directed to novel features wherein a permeable body formed of powdered metal is joined to a supporting metal structure so as to become integral therewith in all areas except where they are formed between the permeable and impervious portions of the structure.

The resultant porous fabrication may be utilized advantageously in various applications. For example, it may be employed in the subsequent manufacture of gas burners that are intended to provide evenly distributed heat over large surfaces. In such application a combustible gas is distributed by the fluid channels to different portions of the permeable body through which it flows to emanate on the combustion side thereof substantially uniformly over most of the surface of that body at a substantially uniform rate, thus producing a flame blanket. The resultant porous fabrication may also be utilized advantageously in the construction of evaporative coolers whereby an efficient cooling surface is obtained by using the porous metal body as a means through which to distribute over a large area the liquid which is to evaporate for the purposes of transpiration cooling. In a further application, the porous fabrication may be utilized in the construction of filters wherein the porous metal body provides a controlled porosity and permeability so as to enable a liquid carrier to filter through the porous metal body while leaving filtrate on the other side thereaof. As will be recognized, one of the most important limitations restricting the use of porous fabrications resides in the fact that it is very difficult and costly to provide conduits which conduct fluids efficiently to the appropriate faces or portions of the porous metal bodies, and therefrom to be distributed into and through such porous metal bodies for the purposes of combustion, evaporation, filtration, or other purposes. Another limitation of porous metal bodies restricting their use in components designed to transfer heat from one medium to another derives from the fact that the heat conduction of such porous bodies is less than that of solid metal bodies and that it is difficult and costly to effect efficient heat transfer to the porous bodies and through them. While the techniques and methods of producing pervious or porous bodies from powder metal have been extensively discussed in the literature such as for example in "Powder Metallurgy" by Dr. Paul Schwarzkopf (the Macmillan Company, New York, 1947) and "Powder Metallurgy" edited by John Wulff (the American Society for Metals, Cleveland, 1942) no economical and efficient method has been found thus far to overcome the limitations above referred to prior to the invention described in the aforesaid co-pending applications; the basic concept of the contribution therein comprises the forming of an integral structure of two or more metal layers of differing characteristics, of which at least one layer is porous and pervious to fluids, such as gases or liquids, and the others impervious and solid, these layers being secured together, preferably through a sintering operation, although brazing and other means may also be employed, so as to enable the formation of fluid channels in predetermined portions between the confronting faces of various layers comprising the integrated porous structure.

In accordance with the disclosure of the aforesaid co-pending applications, the porous fabrication is formed from a supporting sheet metal member which may have all or a portion thereof in the form of a flat, relatively thin plate, sheet, or strip. A pattern of weld-inhibiting material is applied to this member in a design corresponding to that desired for the fluid conducting channels which are to be provided in the ultimate structure. Following the application of the weld-inhibiting material, a substantial layer of powdered metal aggregate is deposited upon the plate thus treated. Subsequent thereto this composite structure may be subjected to pressure to compact the powdered metal and to press it firmly against the solid plate. This compacted assembly is then exposed to a suitable sintering temperature under conditions preventing undesired reactions, such as oxidation of the metal. This sintering operation accomplishes the sintering of the powdered metal particles to each other together with the metallurgical bonding, welding, of the sintered metal aggregate to the solid member.

In an alternate method disclosed in the foregoing co-pending application, the powder metal layer may be separately formed by known powder metallurgy techniques. In this method the solid sheet metal member may be first prepared by applying a pattern of weld-inhibiting material to the portions thereof at which the fluid channels are to be formed, and applying to one side of the porous metal layer a suitable thin layer of soldering or brazing metal. The porous metal layer is then superimposed upon the solid plate so as to sandwich the weld-inhibiting material between them, and the composite subjected to a thermal treatment to accomplish the brazing or soldering of the porous metal layer to the sheet metal member in all adjacent areas thereof except in those portions separated by the weld-inhibiting material.

The resultant composite structure may now be adapted for the conducting of fluids by deforming or flexing those portions of the sheet metal member, which are disposed opposite the weld-inhibiting material, away from the porous metal layer. This can be accomplished for example by introducing a fluid under pressure into the ununited portions of the composite structure formed between the porous layer and a sheet metal member, or mechanically, by insertion of suitable mandrels into these areas. This deformation of the sheet metal member away from the porous metal layer will form fluid channels defined on one side by an impervious metal wall portion and on the other side by the porous metal.

As will be understood, various combinations of materials may be utilized in forming the integrated composite structure; and accordingly the solid sheet metal member and the porous layer or body may be of the same metal or alloy, or the porous structure and the solid member, of the integrated structure, may be comprised of different compositions. For example, both the porous metal layer and a solid sheet metal member may be formed of the same stainless steels, coppers, brass, carbon steels, aluminum or various combinations thereof. As will be understood the ultimate use of the resultant integrated structure determines the specific combination of alloys to be employed.

Accordingly, among the objects of this invention is to provide a novel fluid permeable porous metal structure adapted to distribute a fluid and heat in flow therethrough.

Other objects and advantages of this invention will become more apparent from the following drawings and description in which FIGURE 1 is a perspective view of one embodiment of the present invention, with portions cut away, in a preliminary stage of fabrication;

Figure 1:
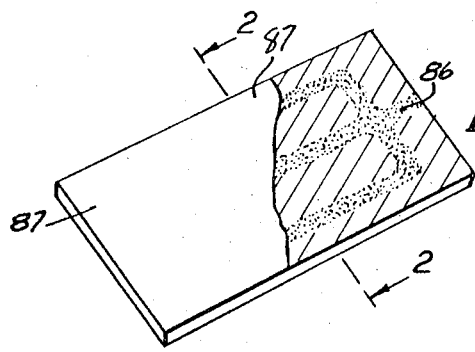

In regard to production of the porous body, it may be obtained by the so-called gravity sintering method which comprises a process wherein graded metal powder, frequently spherical metal powder, is poured by gravity into an appropriately shaped confined space, and usually vibrated to cause it to compact uniformly. As is obvious the choice of particle size of the metal powder will largely determine the amount of porosity, i.e. void space. The metal powder or aggregate so packed in then sintered in accordance with well-known powder metallurgy practices, producing a porous metal body whose bulk density, or apparent density, is but a fraction of the density of the metal or alloy from which the powder particles are obtained. Generally the conditions of vibration and conditions of sintering are chosen to result in an apparent density of approximately 25% to 75% of the solid density of the corresponding alloys. In another procedure for the production of such porous metal bodies the process may comprise blending intimately a graded metal powder with a combustible substance, such as for example wood flour or other organic particulate material, or a soluble material whose melting point exceeds the sintering temperature of the metal powder. After the formulation of this dry blend, the mixture of metal powder and combustible or soluble substance is then compacted under pressure, such as by rolling resulting in a body that has no voids and is reasonably firm, sufficient for handling. This body is then sintered in accordance with well-known powder metallurgy practices to produce a cohesive structure in which the metal particles are sintered together at their respective points of contact and the combustible or soluble material remains unbonded to the metal particles forming discrete islands within the metal body. Upon completion of the sintering operation and if the non-metallic component is combustible, then the resultant body will in fact contain void spaces everywhere previously occupied by the combustible material since the latter will have burned away in the course of sintering. In the case utilizing a soluble material whose melting point is higher than the sintering temperatures of the metal, the soluble material will remain intact after the final stages of sintering and can be subsequently removed by leaching and dissolving with a liquid, resulting in a network of interconnected pores.

In the modification of the foregoing it is noted the above described dry blend of metal powder and combustible or soluble substance may be replaced, respectively, by a paste or slurry obtained by suspending the admixed powder metal and combustible or soluble particles in a suitable liquid vehicle, as for example water or alcohol; or in applications where the combustible substance is mostly organic, by choosing a combustible substance that is a viscous liquid instead of being particulate such as for example a liquid phenolic resin. Alternately the mixture of metal powder and void or pore forming substance and vehicle, or void or pore forming substance alone, may be prepared into a paste which may be brought into the desired shape by pressing or extrusion.

A further method of producing the intered porous metal bodies comprises melting a metal or alloy and casting it into the interstices of a porous aggregate of a particulate soluble material whose melting point exceeds that of the metal. Upon solidification of the metal, a component is produced which contains the network of the soluble material interspersed within the solid metal which soluble material is thereupon removed by leaching or dissolving, leaving behind it interstices that interconnect and form a porous network within the resultant metal body. Soluble substances contemplated for these purposes, be it for blending with solid metal powder or for the above casting process, comprise sodium chloride in conjunction with aluminum and aluminum alloys, aluminum fluoride in conjunction with copper alloys, and calcium oxide in conjunction with alloys having melting points higher than copper alloys. As will be understood other substances, particularly inorganic salts, are readily available and known to the art for such purpose as for example various phosphates, such as tri-sodium phosphate.

A still further method of producing a porous metal body comprises weaving or knitting metal wire into a mesh arranged in a plurality of layers. According to this process, a control of porosity is obtained by appropriate choice of wire diameters and openings arranged between adjoining wires as well as the juxtapositioning of superimposed layers of the woven or knit mesh.

Although a specific mass of sinterable metal has been described, it is pointed out that other formulations of sinterable materials may also be used, as for example those metal oxides, carbides and nitrides, or mixtures thereof, containing if necessary pore or interstice forming materials discussed above.

Various substances are known to be effective in preventing adhesion of one metal body to another, even under severe pressure, as in rolling, at elevated temperatures, as in the course of soaking prior to rolling, or diffusion-annealing, etc. In fact, many substances present in metal as accidental impurities, as for example manganese sulphide in steel, operate to produce seams and other discontinuities in rolled products. Among these substances are graphite, applied for example in the form of colloidal suspensions, boron nitride, talcum, zinc oxide, titania, and many others, each within certain limits of applicability that are not relevant here. In fact, it has been noted that on occasion during roll-welding of two superimposed sheets interference with the integration occurs even by the mere presence of an accidental oil smudge on the surfaces of the sheets. For purposes of the present invention, the separation or weld-inhibiting materials employed need not withstand exposure to high pressures or be capable of extending under pressure which normally are requisites of stop-weld resist used in pressure welding. Instead, the weld-inhibiting material employed as the spacer or supporting substance herein need only have reasonable mechanical strength to function as a spacer or support before the superimposed particulate material acquires strength of its own as the sintering operation progresses. The weld-inhibiting material employed as a spacer or supporting substance should preferably be capable of being applied at room temperature as a powder or by spraying, painting, extrusion, etc.; if needed, harden with the least time delay, and remain in place through the better part of the subsequent operations which usually comprise the application of a loose particulate metal layer of transporting the composite preparatory to a sintering operation and of sintering. Moreover, this spacer or supporting substance must be capable of removal following the sintering operation even if the channel network is extremely complex and tortuous.

Preferably the spacer or supporting substances contemplated herein are liquid soluble and have a melting point higher than the sintering temperature of the particulate metal layer, or at least higher than the temperature at which that layer commences to acquire reasonable mechanical strength in the course of sintering. Such soluble substances are for example sodium chloride, which melts at 801° C., a temperature somewhat below the customary sintering temperature of copper; and it may be used in connection with copper aggregate because the latter will acquire adequate strength during sintering before the sodium chloride begins to melt. Other such soluble substances are sodium aluminate (melting at 1650° C.), potassium sulphate (melting at 1076° C.), sodium metasilicate (melting at 1088° C.), aluminum chloride (melting at 1040° C.), and others. The choice of such soluble spacer or supporting substances will of course also depend on possible solid phase reactions with the metal surrounding them, at the temperature of sintering. For example, while one of the most effective weld-inhibiting materials adapted for use as the spacer or supporting substance in connection with copper and aluminum alloys is graphite or carbon, austenitic stainless steel would be harmed by that spacer substance through carburizing.

In this respect it is pointed out that also contemplated within this invention is the utilization of a specific form of a carbon as a weld-inhibiting material in the fabrication of these composite structures. The particular form of carbon contemplated is that obtained in situ, from organic substances, by pyrolysis. As is known, progressive elevated temperature exposure of a variety of organic substances in inert or reducing atmospheres results in progressive thermal degradation of the organic material an ultimately in pyrolysis similar to coking. The residual carbonaceous matter is strong and cohesive as well as stable, except under oxidizing conditions at elevated temperatures. The resultant weld-inhibiting material, originally introduced as an organic substance may thus maintain reasonable mechanical strength and its functional integrity not only at room temperature but also throughout the process of heating during the sintering operation, while the powder metal acquires appreciable strength and ability to support itself over a preformed channel forming the groove of the desired composite structure. However, the organic material applied to the solid metal surface or within the preformed channel of a solid metal member, may be used as a weld-inhibiting material only if the carbonaceous residue remaining after the sintering operation is removable. This in turn depends upon the particular metal aggregate applied above it which must be pervious and porous enough to permit the ambient atmosphere to react freely with the contents of the channels. In such a case, the pyrolized organic substance will break down further and oxidize without residue, if the sintering furnace atmosphere is adjusted to allow for progressive formation of gaseous carbon compounds, or, as is preferable, if exposed to air while still hot enough to oxidize vigorously.

For example, a paste-like mixture of silica sand and a phenolic varnish of the renol type may be used. The weld-inhibiting materials so formed can be hardened at room temperature and then upon exposure to increasing temperatures, will progressively harden and cure as is naturally expected for a phenolic resin, and thereafter progress through several stages of heat degradation while heated to still higher temperatures in an inert atmosphere. In a specific application in which sperical copper particles were metallurgically bonded to a copper sheet, during the course of the sintering operation the sand particles remained bonded together due to the carbonaceous residue of the phenolic resin. Upon removal of the sintered composite from the furnace and while still at an elevated temperature approaching that of the furnace, but now exposed to ambient air, the carbon oxidizing almost instantaneously leaving the sand free flowing and devoid of any bond.

Oxidation of the pyrolyzed residue may be accomplished usually by more exposure to an atmosphere containing sufficient oxygen to burn the carbon, but not enough to oxidize the metal harmfully. In the case of copper, sintering may be followed by air exposure at room temperature, as above described; in the case of stainless steels, if brightness is to be preserved, cooling after sintering may take place in a protective atmosphere which may have just enough oxygen to react with the carbon. A wide variety of such weld-inhibiting spacer and supporting substances are readily available and known to the art; and in principle such formulations usually consist of free flowing comparatively inert granular materials, such as silica sand, bonded with phenol formaldehyde, urea-formaldehyde, polystyrene, polyethylene, furfural formaldehyde, coal tar, etc., or such organic materials alone and others, for example, paper, adhesive tape, etc., in the event that only thin films need to be applied prior to sintering.

As will be understood, the selection of materials from which the porous and solid components are made to comprise the structures described herein and in the copending application, is based on considerations within the skill of persons acquainted with mechanical, physical and chemical properties of materials. While the structures described herein have been identified as being metallic on numerous occasions, it is pointed out that all or parts of these structures may be made of non-metallic materials, as called for by their intended use. Thus, the porous layer may incorporate catalysts, as pointed out in the copending application, which catalysts may be non-metallic. The porous layer may also consist in part or entirely of glasses, carbides, nitrides, oxides, or borides, for example in instance calling for heat resistance, corrosion resistance or insulating properties not available in metals and alloys. The porous layer may also consists of synthetic polymeric substances, for similar reasons, as for example sintered porous fluoro-carbon resins, silicone resins, and others. The solid component is usually made of metal strip or plate which may be coated with non-metallic materials of the kind referred to. In instances not calling for high strength the solid component may also be made of synthetic resins made into strip, sheet or plate stock.

Several of the embodiments described herein may be made advantageously of non-metallic components. Thus, a component intended to distribute highly corrosive inorganic acid vapors may be made of fluorocarbon resins; another intended to serve as diffuser of combustible gas also acting as a radiant burner may be made in part of silicone carbide. Other examples are obvious to those skilled in the art of constructing components to be used in environments of high temperature and corrosive attack.

It will be understood that the porous layer referred to herein may be produced in still additional ways either in situ, upon the surface of a solid component or separately, to be joined thereto. Thus, the porous component may be produced by mechanical perforation of a solid, metallic sheet, however, such a method would generally be expensive and cumbersome. The porous layer may also be produced by spraying of metal by techniques well-known to those skilled in the metal working art and carried out either with a wire gun or powder gun, whereby, through appropriate and well-known adjustment of the spray gun, the spraying process may be directed so as to produce a porous sprayed deposit. A porous sprayed deposit may also be produced with a powder gun by spraying along with the material intended to form the porous layer and intimately intermingled with it an evanescent solid which will be deposited along with the rest of the sprayed material and which may then be removed from the porous composite by leaching as described in previous examples. However, this procedure of producing the porous layer by spraying is also cumbersome and expensive in most instances, compared to the other means described herein and in the co-pending applications.

Figure 2:
FIGURE 2 is a sectional view along lines II—II of FIGURE 1.
Figure 5:
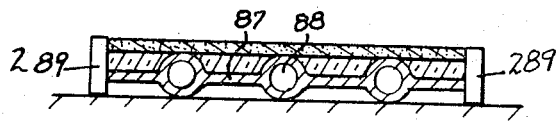
FIGURES 3 through 6 are sectional views similar to FIGURE 2 showing further embodiments in various stages of fabrication.
Figure 3:
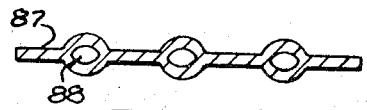
Figure 6:
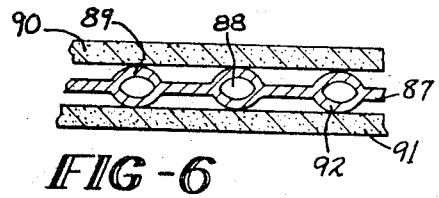
Figure 4:
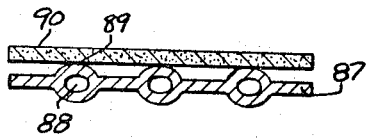
Figure 7:
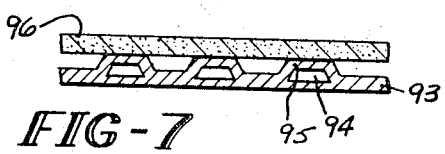
FIGURE 7 is a sectional view similar to FIGURE 2 showing a still further embodiment.

FIGURES 1 to 3 illustrate an embodiment of the present invention utilizing for a solid sheet metal member a sheet metal unit containing internally thereof a pattern of fluid passageways such as obtained in accordance with the process fully disclosed in a patent to Grenell, U.S. Patent No. 2,690,002, granted on Sept. 28, 1954. According to the method defined in this patent, a foreshortened pattern of weld-inhibiting material 86 is applied to a clean surface of a sheet of metal and a clean surface of a second sheet of metal is superimposed on this surface. These two sheets are then secured to prevent relative movement between them and are then welded together in the adjacent areas of the sheets which are not separated by the weld-inhibiting material. Unification of the sheets results in an unjoined portion 86 between the outer surfaces of the unified sheet 87, which unjoined areas are distended by injection therein of a fluid pressure of sufficient magnitude to permanently distend the blank in the area of the unjoined portion to form a desired pattern of passageways 88 which are defined by an oval configuration when expanded without external constraint of the expansion. In accordance with one method of this invention for fabricating the porous composite structures embraced therein, the distended structure 87 is then adapted for the formation of the porous composite structure of this invention by positioning it between oppositely disposed containing walls 289 adapted to confine the components to be superimposed on the face of the expanded unit 87. The troughs defined between the crest 89 of the bulges defining passageways 88 are filled with an evanescent material, such as the combustible or liquid soluble substances described above, followed by superimposing thereon a compacted body of particulate granules, with the assembly thereafter bonded together in any appropriate manner as by sintering. Upon elimination of the evanescent material the particulate aggregate forms a sheet-like sintered porous body 90 bonded to the crests 89 of the bulges defining fluid passageways 88 contained within the sheet metal unit 87. If desired each of the pair of opposite faces of the sheet metal unit 87 may be provided with a sheet-like sintered porous metal body as illustrated in FIGURE 6. As shown therein a second sheet-like sintered porous body 91 is superimposed on the external face of sheet metal unit 87 and bonded to the crest 92 of the distended bulges defining fluid passageways 88.

Although the preceding embodiment was directed to internally laminated sheet metal units freely distended into passageways defining bulges of oval configuration, the invention is applicable where the distention is constrained and restricted to any one side of the panel as illustrated in FIGURE 1 and obtained by methods similar to those disclosed in U.S. Patent No. 2,993,263. As illustrated herein an internally laminated sheet metal unit 93 is constrained in its distention between flat rigid surfaces permitting the distention to be restricted to only one side of the panel to form passageways 94 defined by bulges having flat top crests 95 to which is bonded a sheet-like metal porous body 96.

Figure 8:
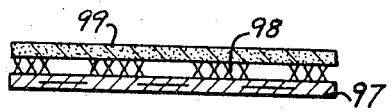
FIGURES 8 and 9 are sectional views similar to FIGURE 2 showing a still further embodiment in different stages of fabrication.
Figure 9:
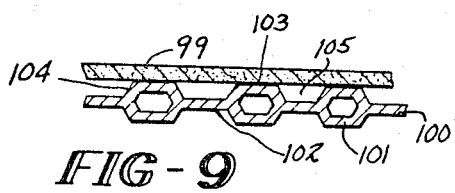
Figure 11:
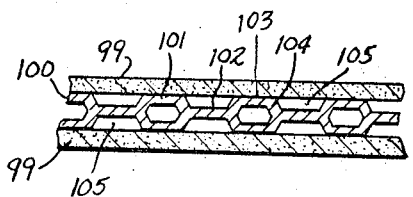
FIGURES 10 and 11 are sectional views similar to FIGURE 2 showing a still further embodiment in different stages of fabrication.
Figure 10:
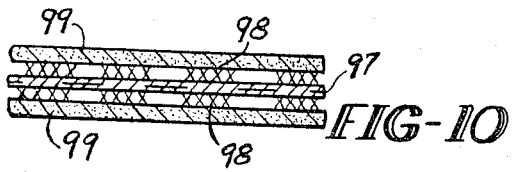
Figure 12:
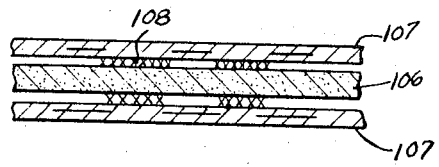
FIGURES 12 and 13 are sectional views similar to FIGURE 2 showing an additional embodiment in different stages of fabrication.
Figure 13:
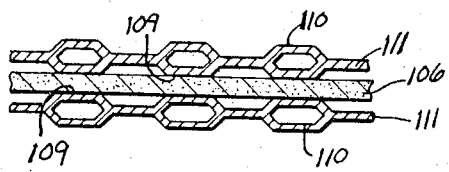

In accordance with another embodiment of this invention an internally laminated sheet metal unit 97 adapted for distention is coated on one or both of a pair of opposite faces, as in respectively FIGURES 8 and 10, with a pattern of stop-weld material 98 applied in the design disposed in overlapping and staggered relationship with the internal laminations of sheet metal unit 97. Thereafter a sheet-like sintered porous metal body 99 is superimposed on the face of the sheet metal unit 97 coated with the weld-inhibiting material and the assembly subjected to a sintering operation which causes the diffusion bonding between the porous metal body and the sheet metal unit in all areas except those covered by the weld-inhibiting material 98. The resultant composite unit is then subjected to a forming operation such as hydraulic inflation carried out by injecting pressure fluid into the internal laminations of the solid sheet metal unit 97 only, resulting in the type of structures illustrated in FIGURES 9 and 11. That structure will be a tube sheet 100 having tube portions 101 interconnected by integral web sections 102 wherein one or both faces of the tube sheet will have a sheet-like sintered porous metal body bonded to the crest of the tubes. As will be understood, in the course of forming, such as by hydraulic inflation as described, the area of the original sheet corresponding to crest 103 of the tube sheet which adhered to the porous body 99 cannot be formed during the distention of the internal laminations, therefore restricting the deformation to the portions 104 of the tubes whereby these portions become stretched in course of hydraulic inflation while the porous metal body remains almost completely unaffected. The resultant structure automatically forms fluid channels 105 between the solid sheet metal tube sheet and the sintered porous metal layer. Thus, there is produced a unitary metal structure which has internal tubular passages in the solid metal tube sheet, and an additional network of fluid channels between the solid sheet, metal tube sheet and the porous components, and of course, an overall porous layer. In an alternate modification, shown in FIGURES 12 and 13, an internally laminated sheet metal unit 107 was superimposed on each of the opposite faces of a sheet-like sintered porous body 106, sandwiching between all confronting faces a pattern of weld-inhibiting material 108 in accordance with the foregoing. Upon joining and distention, a composite results in which the sintered body 106 has metallurgically bonded to each of its opposite faces the crest 109 defining the tubular passageways 110 of tube sheet 111.

Figure 14:
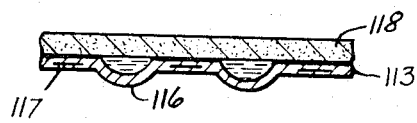
FIGURES 14 and 15 are sectional views similar to FIGURE 2 showing an additional embodiment in different stages of fabrication.
Figure 15:
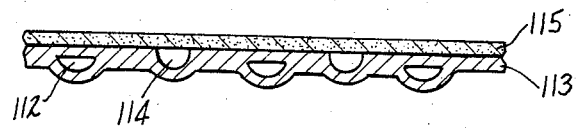

In a still further embodiment, shown in FIGURES 14 and 15, a unitary composite can be provided with a first set of fluid passageways 112 within a solid sheet metal unit 113 and a second set of fluid channels 114 between the solid sheet metal unit 113 and a sheet-like sintered porous body 115 by deforming the solid sheet metal unit 113 into groove-like indentations 116 before any of the internal laminations 117 of the sheet metal unit 113 are formed. Thus, a network of channels between the solid and porous components may be produced as shown in FIGURE 14 in which the sheet metal unit 113 containing the laminations 117 has the channels preformed by the groove-like indentations 116 embossed within solid portions of the sheet metal unit 113 disposed between the laminations 117. These channels are thereafter filled with a spacer or supporting material, and a body of particulate metal powder 118 applied over the sheet metal unit 113. Following the sintering operation and hydraulic inflation of laminations 117, a structure, such as ilustrated in FIGURE 15, is obtained in which a sheet-like sintered porous body 115 is metallurgically bonded to the sheet metal unit 113 in all of the regions except the ones juxtaposed over the fluid channels 114 whereas the laminations 117 will have formed fluid passageways 112.

Figure 16:
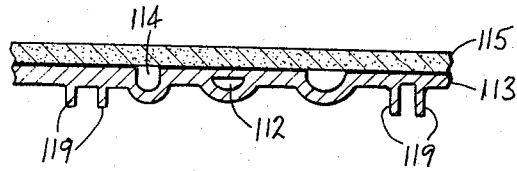
FIGURE 16 is a sectional view similar to FIGURE 2 showing a still further embodiment of the present invention.

It is noted that some or all of these tubular passageways may serve to conduit fluids or to impart rigidity to the overall composite structure of both. If it is desired to impart particularly high rigidity to the structure then some of the tubular passageways 112 may be severed and the separated sheet portions suitably turned into a cross-section having a high section modulus such as shown in FIGURE 16, which again shows a sheet-like sintered porous layer 115 superimposed and metallurgically bonded upon a solid sheet metal unit 113 which contains alternating fluid channels 114, closed fluid passageways 112 contained within the sheet metal unit 113 and reinforcing ribs 119 formed from laminations similar to the ones developed into the fluid passageways 112.

Although the foregoing illustrates bonding of a porous metal layer to only one side of the solid sheet metal unit 113, it will be obvious that it may be provided on both sides or in preselected areas only rather than over the entire solid sheet metal unit. It is also readily possible to superimpose several structures of this kind. As will also be evident the invention is susceptible to the production of intricate metallic structures by layer-wise superimposition of several of the aforedescribed internally laminated units and subsequent hydraulic formation of the laminations contained therein. In accordance with this invention, it is moreover possible to interpose or sandwich between the porous components, and to alternate, layers of the internally laminated sheet metal units with layers of porous metal whereby several channel networks are generated which may in principle be subdivided into one set of passageways entirely contained within the solid sheet metal unit and another set of fluid channels interposed between the solid sheet metal unit and the porous components.

As indicated above, the composite structures of this invention are adapted for many applications and particularly for use as heat exchangers. As is well known, tubular components used in heat exchangers were heretofore usually provided with fins, corrugations and other extensions of their surface so as to present an economic maximum extended surface area for a given weight of heat exchanger structure. However, such heat exchanger structures can be provided with greatly increased heat transfer surfaces by i.e. heat conductive bonding of a solid sheet metal unit to a sheet-like layer of sintered porous metal in accordance with any of the methods described heretofore. As has been discussed the sheet-like porous metal component is attached to the solid sheet metal unit by a metallic bond which will warrant good heat transfer with channels provided between the confronting faces of the components by interrupting the metallurgical bond in predetermined areas and in a predetermined pattern. These channels serve to conduct a fluid between the solid and porous layers with subsequent diffusion of flow through the porous body, thereby contacting the large surface area within the porous body, as defined by the innumerable interstices extending between the integrated particles of the porous body. For example for application in refrigeration systems, where the solid sheet metal unit is internally laminated with its laminations distended into a system of fluid passageways, the fluid contained within the solid metal component may be water and the fluid contained within the channels may be liquid refrigerant or refrigerant vapor, as would be the case when such composite structures are used as refrigeration condensers or evaporators.

Figure 17:
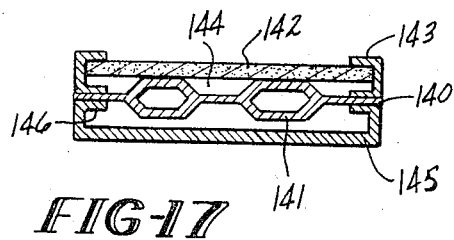
FIGURE 17 is a sectional view similar to FIGURE 2 showing an additional embodiment of the present invention.

This invention may provide heat transfer between two fluids, and this invention may also easily provide a heat transfer relationship between three fluids, as illustrated in FIGURE 17. As shown therein, a sheet metal unit 140 is provided internally with a system of fluid passageways 141 and has conductively bonded to the crest of the bulges extending on one side of unit 140 a sheet-like sintered porous body 142. Sheet metal unit 140 is also mounted within U-shaped channel members 143, secured to its face. These components, as in the embodiments described above, provide a plurality of means for conducting a plurality of fluids i.e., through passageways 141, and through the fluid channels 144 disposed between the confronting faces of the porous body 142 and the sheet metal unit 140. Thus, this composite is adapted for the conducting of a third fluid by securing to the opposite face of sheet metal unit 140 a U-shaped channel member 145 secured to the unit by means of its inwardly projecting flanges 146.

Although the invention has been described with reference to specific embodiments, materials, and details, various modifications and changes, within the scope of this invention, will be apparent to one skilled in the art and are contemplated to be embraced within the invention.

What is claimed is:
1. A composite structure comprising a one-piece integral sheet metal member internally laminated with said laminations distended into internal fluid passages forming bulges out of at least one face of said member, a sheet-like porous body superimposed on said face in abutting relationship with the crest of said bulges and disposed in spaced relationship to the portions of said member disposed between adjacent crests on said face.

2. The structure of claim 1 wherein said laminations are distended to bulge out of only one face of said member.

3. The structure of claim 1 wherein said bulges are characterized by a flat-top configuration forming said crests.

4. The structure of claim 3 wherein said laminations of said member are distended to bulge out of only one face of said member.

5. A composite structure comprising a sheet-like sintered porous metal member, a one-piece integral sheet metal member superimposed on each of a pair of opposite faces of said body with said member being internally laminated with said laminations distended into fluid conduits bulging out of at least one face of said member with said body being in abutting relationship with the crest of said conduits and disposed in spaced relationship to portions of said member disposed between said crest.

6. The structure of claim 1 wherein said body contains a material catalytic to chemical reactions.

7. A composite structure comprising a sheet-like porous body and a one-piece integral sheet metal member superposed on at least one of a pair of opposite faces of said body, said member being internally laminated with said laminations distended into fluid conduits bulging out of only one face of said member with the opposite face thereof of said member being in abutting relationship with said body, and embossments in said member disposed between said conduits forming groove-like indentations protruding out of said one face said of said member.

8. The structure of claim 7 wherein said conduits of said member have a flat-top configuration.

9. The structure of claim 8 wherein said member includes fin-like protrusions extending out of said one face of said member.

10. A heat exchanger comprising a sheet metal member containing internally therein between opposite faces thereof a system of fluid passages for a first fluid, a sheet-like porous body superimposed and metallurgically bonded to one of said opposite faces of said member, fluid channel means for a second fluid disposed between said body and said one face, conduit means for a third fluid disposed adjacent to and defined by the other of said opposite faces with said other face defining a portion of the inner wall of said conduit means.

References Cited by the Examiner
UNITED STATES PATENTS

| 2,766,597 | 10/1956 | Gieck | 62—314 |
| 2,946,681 | 7/1960 | Probst et al. | 75—208 |

ROBERT A. O'LEARY, *Primary Examiner.*

M. A. ANTONAKAS, *Assistant Examiner.*